(12) United States Patent
Scott, III

(10) Patent No.: US 8,006,274 B2
(45) Date of Patent: *Aug. 23, 2011

(54) SYNCHRONIZED MEDIA EXPERIENCE

(75) Inventor: Samuel Thomas Scott, III, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/687,712

(22) Filed: Jan. 14, 2010

(65) Prior Publication Data

US 2010/0122304 A1 May 13, 2010

Related U.S. Application Data

(63) Continuation of application No. 11/107,605, filed on Apr. 15, 2005, now Pat. No. 7,669,219.

(51) Int. Cl.
*H04N 7/173* (2011.01)
(52) U.S. Cl. ............... 725/89; 725/86; 725/88; 725/102
(58) Field of Classification Search .............. 725/86, 725/88, 89, 102
See application file for complete search history.

(56) References Cited

U.S. PATENT DOCUMENTS

| | | | | |
|---|---|---|---|---|
| 5,365,579 A | * | 11/1994 | Hendrickson | 379/102.01 |
| 5,808,662 A | * | 9/1998 | Kinney et al. | 348/14.1 |
| 5,991,306 A | * | 11/1999 | Burns et al. | 370/429 |
| 6,047,288 A | * | 4/2000 | Kurosawa et al. | 1/1 |
| 6,175,872 B1 | * | 1/2001 | Neumann et al. | 709/231 |
| 6,543,053 B1 | * | 4/2003 | Li et al. | 725/88 |
| 6,769,130 B1 | * | 7/2004 | Getsin et al. | 725/89 |
| 7,114,172 B2 | | 9/2006 | Lord | |
| 7,246,367 B2 | * | 7/2007 | Iivonen | 725/102 |
| 7,546,283 B2 | * | 6/2009 | Ota | 1/1 |
| 2003/0002849 A1 | * | 1/2003 | Lord | 386/46 |
| 2003/0088875 A1 | * | 5/2003 | Gay et al. | 725/88 |
| 2003/0126211 A1 | * | 7/2003 | Anttila et al. | 709/205 |
| 2003/0156827 A1 | * | 8/2003 | Janevski | 386/96 |
| 2004/0015813 A1 | * | 1/2004 | Yerushalmy | 717/100 |
| 2004/0221323 A1 | * | 11/2004 | Watt | 725/135 |
| 2006/0031914 A1 | * | 2/2006 | Dakss et al. | 725/135 |
| 2006/0174293 A1 | * | 8/2006 | Ducheneaut et al. | 725/90 |

FOREIGN PATENT DOCUMENTS

| | | |
|---|---|---|
| CN | 1602628 A | 3/2005 |
| WO | WO03050699 A1 | 6/2003 |
| WO | WO03058965 A1 | 7/2003 |

OTHER PUBLICATIONS

The European Office Action mailed Jun. 24, 2011 for European patent application No. 06758377.3, a counterpart foreign application of US patent No. 7,669,219, 6 pages.

* cited by examiner

*Primary Examiner* — Pankaj Kumar
*Assistant Examiner* — Mulugeta Mengesha
(74) *Attorney, Agent, or Firm* — Lee & Hayes, PLLC (57) ABSTRACT

A synchronized media experience is described. A media server identifies a group of two or more remote media entertainment systems through which user-controlled play of media content may be presented. The server generates and transmits one or more synchronization commands to the remote media entertainment systems to synchronize presentation of a particular media content through the two or more remote media entertainment systems. A control command entered by a user of one of the remote media entertainment systems may be communicated to each of the two or more remote media entertainment systems to enable synchronized, user controlled presentation of the particular media content.

20 Claims, 10 Drawing Sheets

SYNCHRONIZED MEDIA EXPERIENCE

REFERENCE TO RELATED APPLICATION

This application is a continuation of co-pending U.S. patent application Ser. No. 11/107,605, filed Apr. 15, 2005 entitled SYNCHRONIZED MEDIA EXPERIENCE, which is herein incorporated by reference in its entirety, and priority is claimed to this application. Any disclaimer that may have occurred during the prosecution of the above-referenced application is hereby expressly rescinded, and reconsideration of all relevant art is respectfully requested.

TECHNICAL FIELD

This invention relates to media entertainment systems, and more specifically to a synchronized media experience.

BACKGROUND

Many existing media entertainment systems include digital video recording (DVR) capabilities that not only enable users to record media content (e.g., television programs), but also provide user control over real-time broadcast programs. For example, a DVR may enable a user to pause or rewind a program that is being broadcast. The user may then resume watching the program and may fast-forward the program up to the point of the program that corresponds to the portion of the program that is currently being broadcast.

While control over real-time broadcast programs is a user convenience provided by DVR technology, it easily leads to scenarios in which multiple individuals watching the same program may be at very different points within the program's timeline. For example, Adam and Bob may both be watching a broadcast of a particular football game. Adam may pause the program for three minutes while he gets himself a snack from the kitchen. Bob may be watching the program straight through, with no pause activity. At some later point in the broadcast, Bob may call Adam on the phone to talk about a great play that just took place in the game. Because Adam had previously paused the game for three minutes (and has not yet fast-forwarded to catch up with the real-time broadcast), Adam has not yet seen the play that Bob is referring to.

Furthermore, Bob and Adam may decide to stay on the phone and discuss the game as they watch it together. However, there is no way to ensure that both viewers are watching the same portion of the program at substantially the same time. For example, if one of the viewers is interrupted by another member of his household, he may choose to rewind the program to see what he missed. This may cause frustration as Bob and Adam attempt to view the program together. In light of control commands available via a DVR system, techniques for enabling synchronized viewing of a particular program by two or more viewers are desired.

SUMMARY

A synchronized media experience is described. A media server identifies multiple media entertainment systems, each capable of presenting a particular media content. Synchronization commands are communicated to each of the media entertainment systems, causing each system to pause, play, fast-forward, rewind, or jump to a particular point within the particular media content, thereby synchronizing presentation of the media content among the multiple media entertainment systems.

A user of one of the media entertainment systems may enter a control command (e.g., rewind, pause, play, fast-forward, channel change, etc.) to the media server. The media server then communicates the control command to each of the media entertainment systems, thereby enabling synchronized, user control of the particular media content.

Synchronization commands and/or control commands may be communicated over any type of network, such as an IP network, a voice-over-IP (VOIP) network, or a media network (e.g., a cable network). Control commands may be submitted by a user via a user interface provided by the media entertainment system or as a voice or touch-tone command, for example, over a VOIP network.

DETAILED DESCRIPTION

The embodiments described below may be implemented to provide a synchronized media experience. Two or more users, each experiencing the same media content through separate media entertainment systems, may establish a synchronization group. The media server then issues commands to the separate media entertainment systems to synchronize the media content being presented to each member of the group. As one or more members of the group submits a media content control command (e.g., pause, rewind, fast-forward, etc.), the control command is received by the media server and forwarded to the media entertainment systems associated with each member of the group. The result is a user-controlled, synchronized presentation of the media content to each group member.

The following discussion is directed to a synchronized media experience. While features of a synchronized media experience may be implemented in any number of different computing environments, they are described in the context of the following exemplary implementations.

Figure 1:
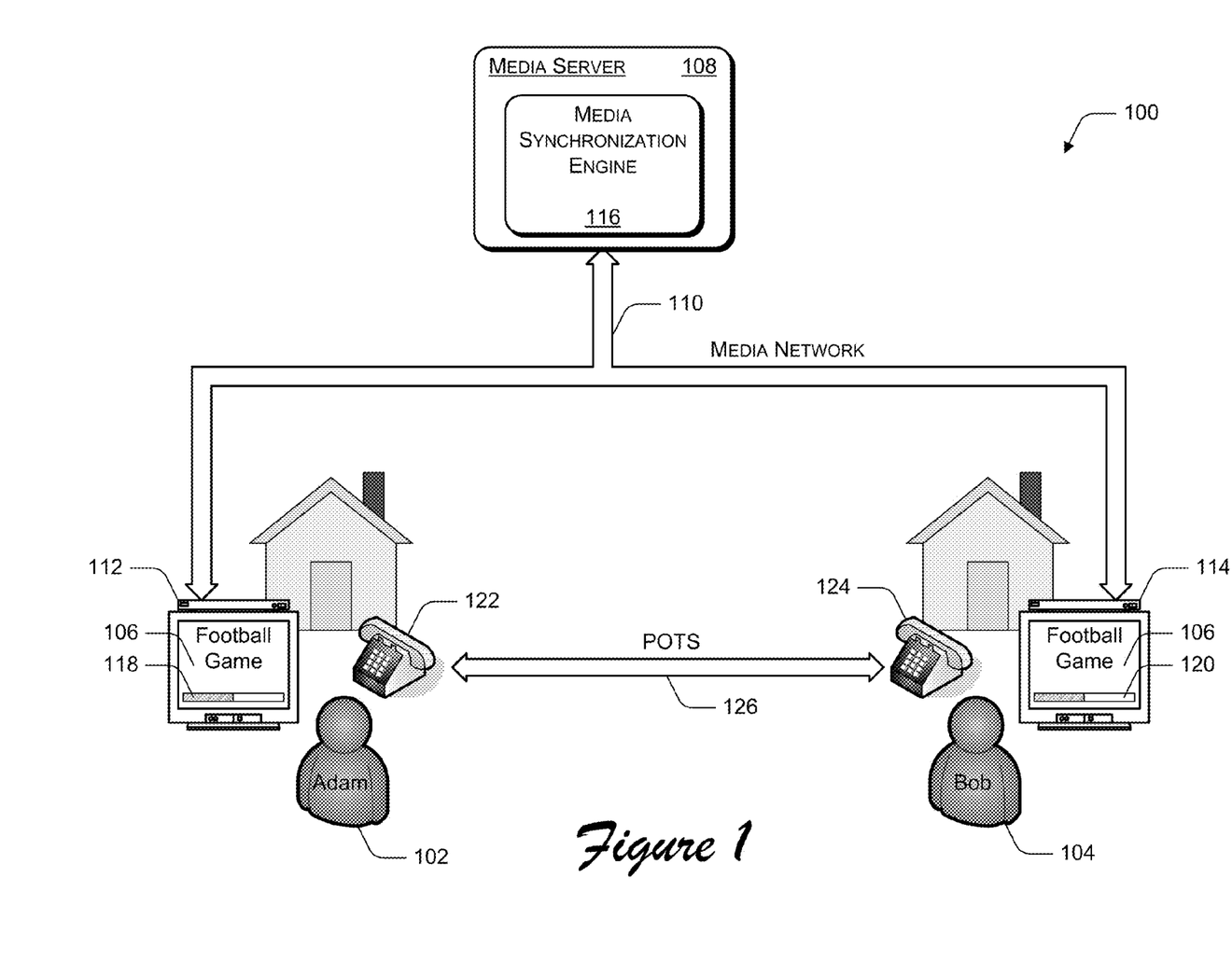
FIG. 1 is a pictorial diagram that illustrates an exemplary network environment in which a synchronized media experience may be implemented.

FIG. 1 illustrates an exemplary network environment 100 in which a synchronized media experience may be implemented. A first user, Adam, 102, and a second user, Bob, 104, are both watching a football game 106. The football game 106 is being transmitted from media server 108 over media network 110 to Adam's client device 112 and Bob's client device 114. Media server 108 includes media synchronization engine 116, which is configured to establish and maintain a synchronization between the media content (e.g., the football game 106) being presented via client device 112 and client device 114. The media content synchronization is represented in FIG. 1 by progress bars 118 and 120, which indicate that client device 112 and client device 114 are both presenting the media content at a substantially identical point in a timeline associated with the media content. In the illustrated example, Adam 102 and Bob 104 communicate with each other (presumably about the football game) using telephones 122 and 124 via a plain old telephone system (POTS) 126. In this example implementation, the communication between Adam 102 and Bob 104 is performed over one network (e.g. POTS 126) and synchronization of media content being presented to Adam 102 and Bob 104 is performed over a separate network (e.g., media network 110).

Figure 2:
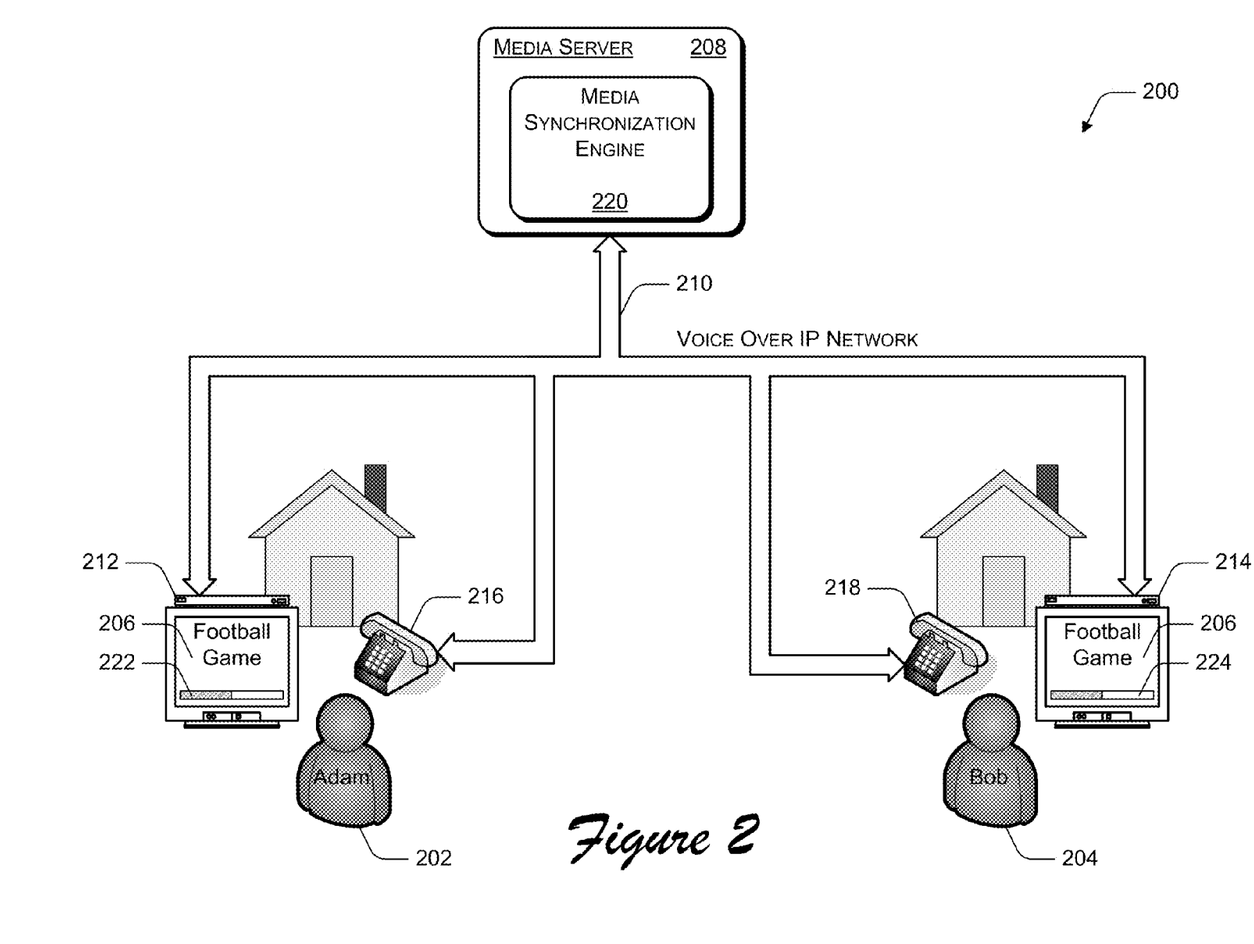
FIG. 2 is a pictorial diagram that illustrates an alternate exemplary network environment in which a synchronized media experience may be implemented.

FIG. 2 illustrates an alternate network environment 200 in which a synchronized media experience may be implemented. A first user, Adam, 202, and a second user, Bob, 204, are both watching a football game 206. The football game 206 is being transmitted from media server 208 over network 210 to Adam's client device 212 and Bob's client device 214. Network 210 is implemented as a voice-over-IP (VOIP) network that supports IP-based communication between media server 208 and client devices 212 and 214. VOIP network 210 also supports voice communication between Adam 202 and Bob 204 via communication devices 216 and 218. Although illustrated as telephones, communication devices 216 and 218 may be implemented as any type of communication device that enables users to communicate over a VOIP network, such as a personal computer equipped with speakers and a microphone. Media server 208 includes media synchronization engine 220, which is configured to establish and maintain a synchronization between the media content (e.g., the football game 206) being presented via client device 212 and client device 214. The media content synchronization is represented in FIG. 2 by progress bars 222 and 224, which indicate that client device 212 and client device 214 are both presenting the media content at a substantially identical point in a timeline associated with the media content. In this example implementation, the communication between Adam 202 and Bob 204 as well as the synchronization of media content being presented to Adam 202 and Bob 204 is performed over the same network (e.g., VOIP network 210).

Figure 3:
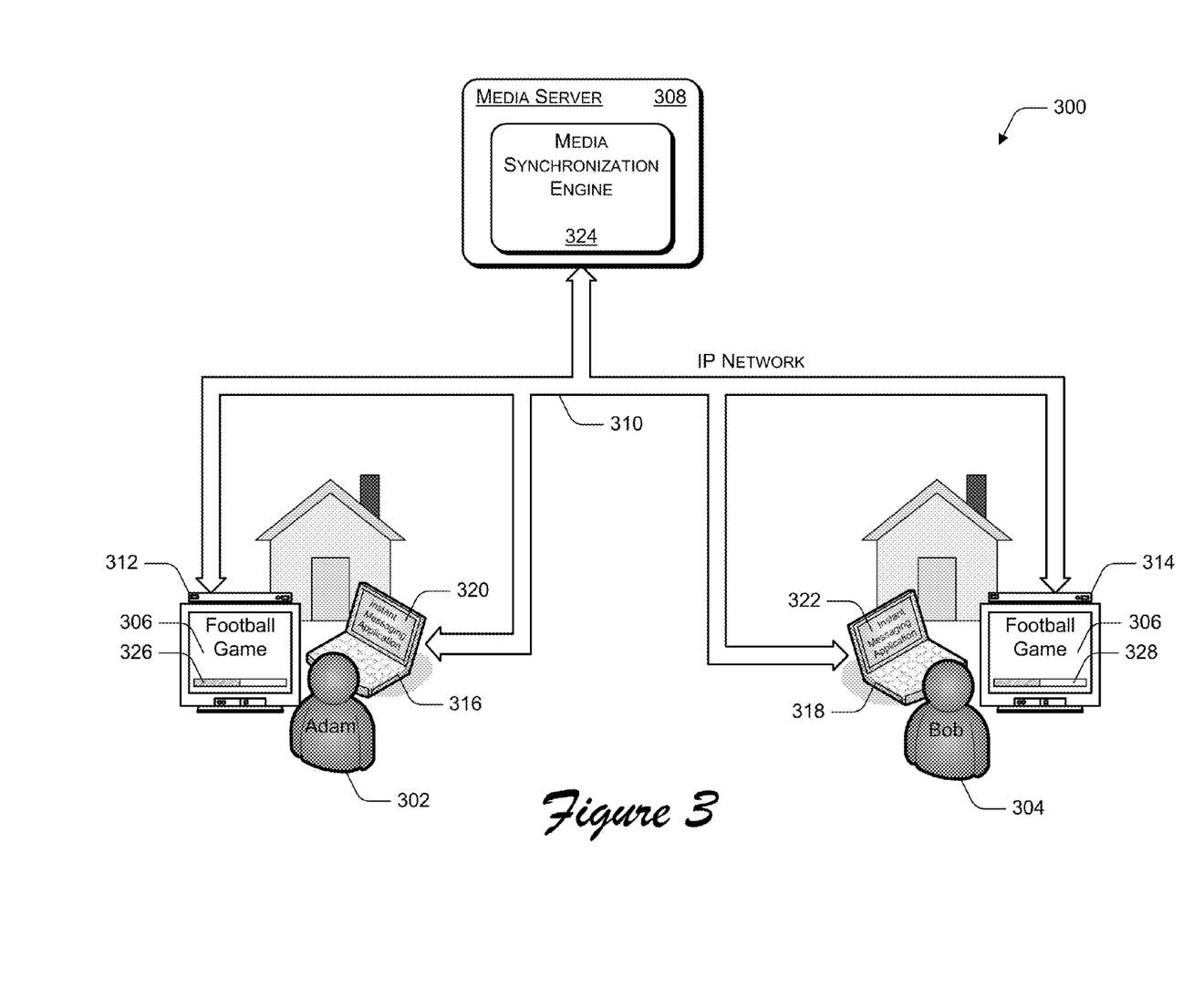
FIG. 3 is a pictorial diagram that illustrates an alternate exemplary network environment in which a synchronized media experience may be implemented.

FIG. 3 illustrates an alternate network environment 300 in which a synchronized media experience may be implemented. A first user, Adam, 302, and a second user, Bob, 304, are both watching a football game 306. The football game 306 is being transmitted from media server 308 over network 310 to Adam's client device 312 and Bob's client device 314. Network 310 is implemented as an IP network that supports IP-based communication between media server 308 and client devices 312 and 314. IP network 310 also supports communication between Adam 302 and Bob 304 via IP-based devices 316 and 318. IP-based devices 316 and 318 are illustrated as personal computer systems running instant messaging applications 320 and 322. In alternate implementations, communication devices 316 and 318 may be implemented as any type of communication device that enables users to communicate over an IP network. Media server 308 includes media synchronization engine 324, which is configured to establish and maintain a synchronization between the media content (e.g., the football game 306) being presented via client device 312 and client device 314. The media content synchronization is represented in FIG. 3 by progress bars 326 and 328, which indicate that client device 312 and client device 314 are both presenting the media content at a substantially identical point in a timeline associated with the media content. In this example implementation, the communication between Adam 302 and Bob 304 as well as the synchronization of media content being presented to Adam 302 and Bob 304 is performed over the same network (e.g., IP network 310).

Figure 4:
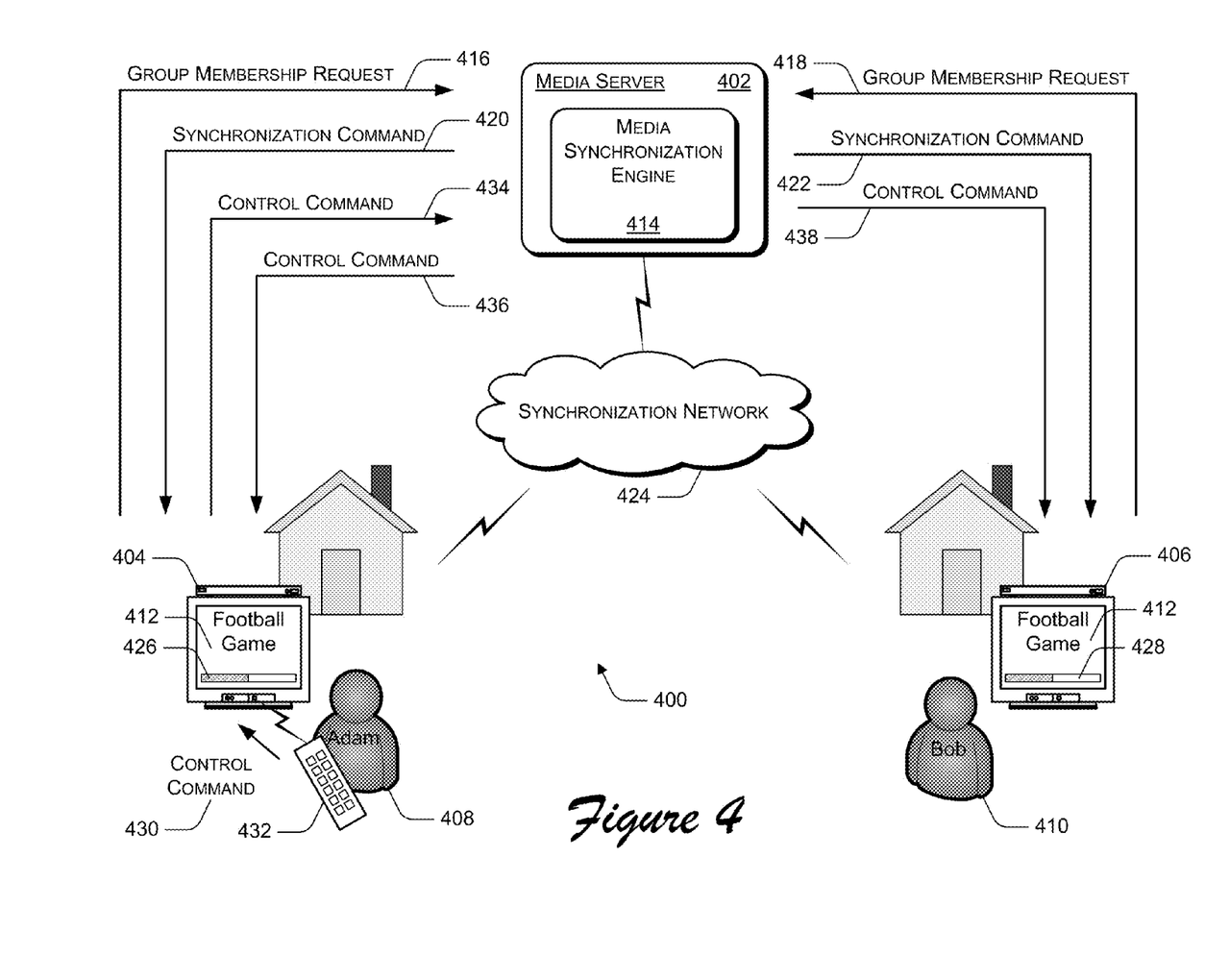
FIG. 4 is a pictorial diagram that illustrates exemplary communications within a network environment to enable a synchronized media experience.

FIG. 4 illustrates exemplary communications 400 between media server 402 and client devices 404 and 406 to enable a synchronized media experience. Users Adam 408 and Bob 410 are both watching a particular media content such as football game 412. Media server 402 includes media synchronization engine 414, which is configured to manage synchronization of media content among members of a synchronization group.

To indicate a desire to participate in a synchronization group, Adam 408 submits a group membership request 416 to media server 402. Bob 410 submits a similar group membership request 418. Group membership requests 416 and 418 may represent requests to form a new synchronization group and/or requests to join an existing synchronization group. Group membership request 416 may also include data that identifies the media content currently being presented by client device 404. Furthermore, group membership request 416 may also include data that indicates a current timeline position associated with the media content currently being presented by client device 404. Similarly, group membership request 418 may include a timeline position and a media content identifier associated with media content that is currently being presented by client device 406.

Media synchronization engine 414 generates synchronization commands 420 and 422 to be communicated to client devices 404 and 406 in response to the received group membership requests 416 and 418. In an exemplary implementation, media synchronization engine 414 generates synchronization commands 420 and 422, which when executed by client devices 404 and 406, respectively, result in media content 412 being presented by both client devices at substantially identical positions in a timeline associated with the media content. Initial synchronization may be established in any number of ways, including, but not limited to: directing each client device to jump to the same point in the media stream (e.g., the beginning, any point in the pause/playback buffer that is common to all of the group members, or, for a real-time broadcast program, the current broadcast position); pause the group member(s) that are at the point in the media content timeline furthest from the beginning, and play or fast-forward the other group members until they are all at the same point in the timeline; pause the group member(s) that are at the point in the media content timeline closest to the beginning, and rewind the other group members until they are all at the same point in the timeline; or converge the group members to a common point in the timeline through any combination of fast-forward and/or rewind. The method used to establish the initial synchronization may be determined automatically by the media synchronization engine 414, or may be determined based on input from one or more of the group members.

Synchronization commands 420 and 422 are communicated to client devices 404 and 406, respectively, over synchronization network 424. Synchronization network 424 is representative of media network 110 shown in FIG. 1, VOIP network 210 shown in FIG. 2, IP network 310 shown in FIG. 3, or any other type of network over which synchronization commands may be transmitted to client devices. After synchronization command 420 is applied by client device 404 and synchronization command 422 is applied by client device 406, media content 412 will be presented through both client devices at substantially identical positions in a timeline associated with the media content. This is indicated in FIG. 4 by progress bars 426 and 428, which indicate substantially identical positions. (Slight, insignificant differences in position may exist due to various factors, such as bandwidth limitations and network traffic.)

In addition to establishing an initial synchronization, media synchronization engine 414 is also configured to maintain synchronization among the group members after the initial synchronization is achieved. For example, Adam 408, a member of the group, may submit a control command 430 to client device 404 via a remote control device 432. Client device 404 communicates the received control command to media synchronization engine 414, as indicated by arrow 434. To maintain synchronization, media synchronization engine 414 communicates the received control command 430 to each group member, as indicated by arrows 436 and 438. In the illustrated example, client device 404 does not apply the control command when it is received from Adam 408, but rather, applies the control command that is received from media synchronization engine 414. In this way, the control command is applied by each client device at substantially the same time, maintaining synchronization.

Various techniques may be implemented for determining which group members are allowed to enter control commands to be applied to the entire group. For example, a group may be established in which control commands from only a single client device (e.g., the client device associated with the user who established the group) are recognized. In such a scenario, the other group members are unable to control the playback of the media content while maintaining their group membership. In an alternate implementation, control commands from any of the group members may be recognized and communicated to each member of the group. In yet another implementation, the determination of which group members may issue control commands for the group may be based on the number of members in the group. For example, in a group with three or fewer members, each group member may be allowed to enter control commands; in a group with four or more members, only a small number of the group members (e.g., three or less) may be allowed to enter control commands. Media synchronization engine 414 may be configured to enforce a particular group structure for allowing control commands. Alternatively, group members may be allowed to select a particular group structure for allowing control commands, which is then enforced by the media synchronization engine 414.

Figure 5:
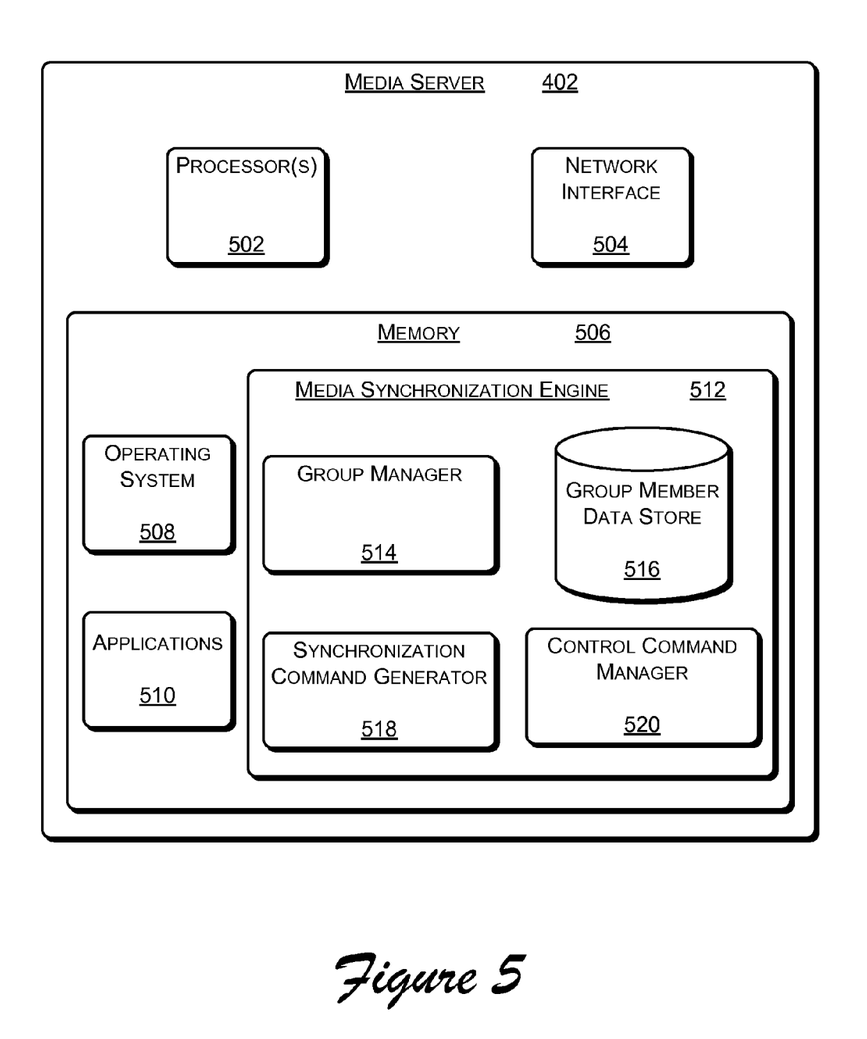
FIG. 5 is a block diagram that illustrates select components of an exemplary media server configured to enable a synchronized media experience.

FIG. 5 illustrates select components of an exemplary media server 402, configured to enable a synchronized media experience. Media server 402 includes one or more processors 502, network interface 504, and memory 506. Network interface 504 enables communication between media server 402 and other computer systems, such as client devices, via a network such as the Internet.

Operating system 508, other applications 510, and media synchronization engine 512 are stored in memory 506 and executed on processor(s) 502. Components of media synchronization engine 512 may include, but are not limited to, group manager 514, group member data store 516, synchronization command generator 518, and control command manager 520.

Group manager 514 is configured to receive group membership requests indicating client devices to be synchronized with other client devices. Group membership requests may be received in any number of different ways. For example, in the exemplary implementation illustrated in FIG. 1, a group membership request may be entered by a user 102 through a client device 112, and submitted to media server 108 via media network 110. In the exemplary implementation illustrated in FIG. 2, a group membership request may be entered by a user 202 through a client device 212, and submitted to media server 208 via VOIP network 210; alternatively, a group membership request may be entered by a user 202 via communication device 216, and submitted to media server 208 via VOIP network 210. In such an implementation, the group membership request may be entered, for example, as a voice or telephone touchtone command. In the exemplary implementation illustrated in FIG. 3, a group membership request may be entered by a user 302 through a client device 312, and submitted to media server 308 via IP network 310; alternatively, a group membership request may be entered by a user 302 via personal computer 316, and submitted to media server 308 via IP network 310.

When group manager 514 receives a group membership request, data is added to group member data store 516. For example, if a group membership request is received indicating that a new group is to be generated, group manager 514 adds data to group member data store 516 that identifies a new group. If a group membership request is received indicating that a user wishes to join an already established group, then group manager 514 adds data to group member data store 516 that indicates that the requesting user is a member of the indicated group.

Group member data store 516 may also maintain data that indicates a method by which group members are to be initially synchronized, and/or rules governing which group members are allowed to submit control commands associated with the group.

Synchronization command generator 518 is configured to generate one or more synchronization commands when a new group has been created or a new member has been added to a group. Synchronization command generator 518 generates a synchronization command for each of one or more members of the group. When executed by the client devices to which they are addressed, the synchronization commands cause media content being presented by each of the client devices to synchronize.

Control command manager 520 is configured to manage control commands received by one or more members of a synchronization group. Control command manager 520 may, for example, receive a control command from a group member, query group member data store 516 to determine how to handle the received control command. Depending on the group configuration, control command manager 520 may either ignore a received control command (e.g., if received from a group member not authorized to control the group) or distribute the command to the members of the group.

Figure 6:
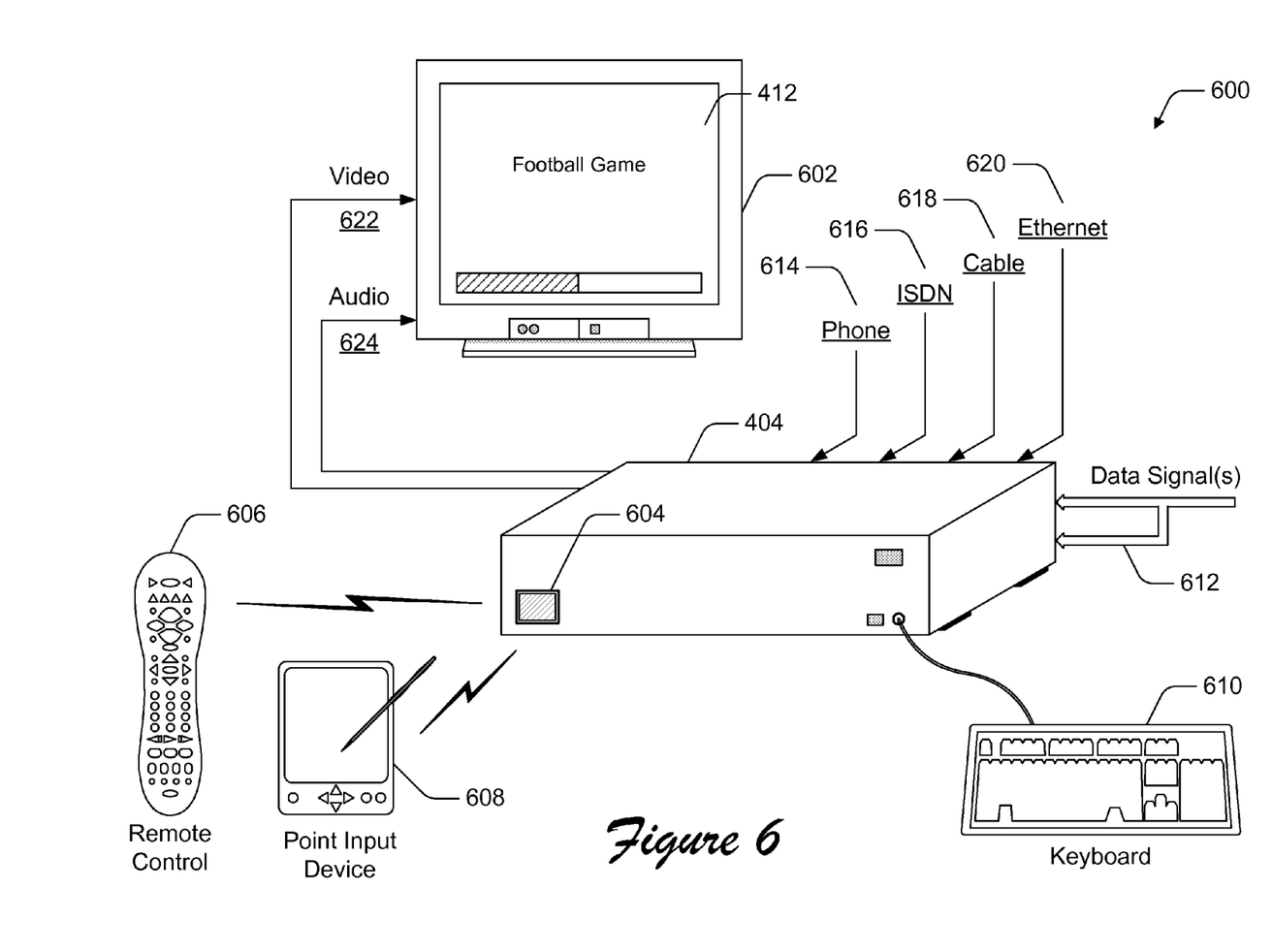
FIG. 6 is a pictorial diagram of an exemplary implementation of a client device shown as a standalone unit that connects to a television.

FIG. 6 illustrates an exemplary implementation 600 of a client device 404 shown as a standalone unit that connects to a television 602. Client device 404 can be implemented in any number of embodiments, including as a set-top box, a satellite receiver, a TV recorder with a hard disk, a game console, an information appliance, a personal computer, and so forth. Client device 404 includes a wireless receiving port 604, such as an infrared (IR) or Bluetooth wireless port, for receiving wireless communications from a remote control device 606, a handheld input device 608, or any other wireless device, such as a wireless keyboard. Handheld input device 608 can be a personal digital assistant (PDA), handheld computer, wireless phone, or the like. Additionally, a wired keyboard 610 is coupled to communicate with the client device 404. In alternate embodiments, remote control device 606, handheld device 608, and/or keyboard 610 may use an RF communication link or other mode of transmission to communicate with client device 404.

Client device 404 receives one or more data signals 612 from one or more data sources, such as from a satellite, the Internet, a communications network, or a media network. Client device 404 includes hardware and/or software for receiving and decoding data signal 612, such as an NTSC, PAL, SECAM or other TV system video signal. Client device 404 also includes hardware and/or software for providing the user with a graphical user interface by which the user can, for example, access various network services, configure the client device 404, and perform other functions.

Client device 404 is capable of communicating with other devices via one or more connections including a conventional telephone link 614, an ISDN link 616, a cable link 618, and an Ethernet link 620. Client device 404 may use any one or more of the various communication links 614-620 at a particular instant to communicate with any number of other devices.

Client device 404 generates video signal(s) 622 and audio signal(s) 624, both of which are communicated to television 602 to present a synchronized presentation of media content 412. The video signals and audio signals can be communicated from client device 404 to television 602 via an RF (radio frequency) link, S-video link, composite video link, component video link, or other communication link. Although not shown in FIG. 6, client device 404 may include one or more lights or other indicators identifying the current status of the device. Additionally, the client device may include one or more control buttons, switches, or other selectable controls for controlling operation of the device.

Figure 7:
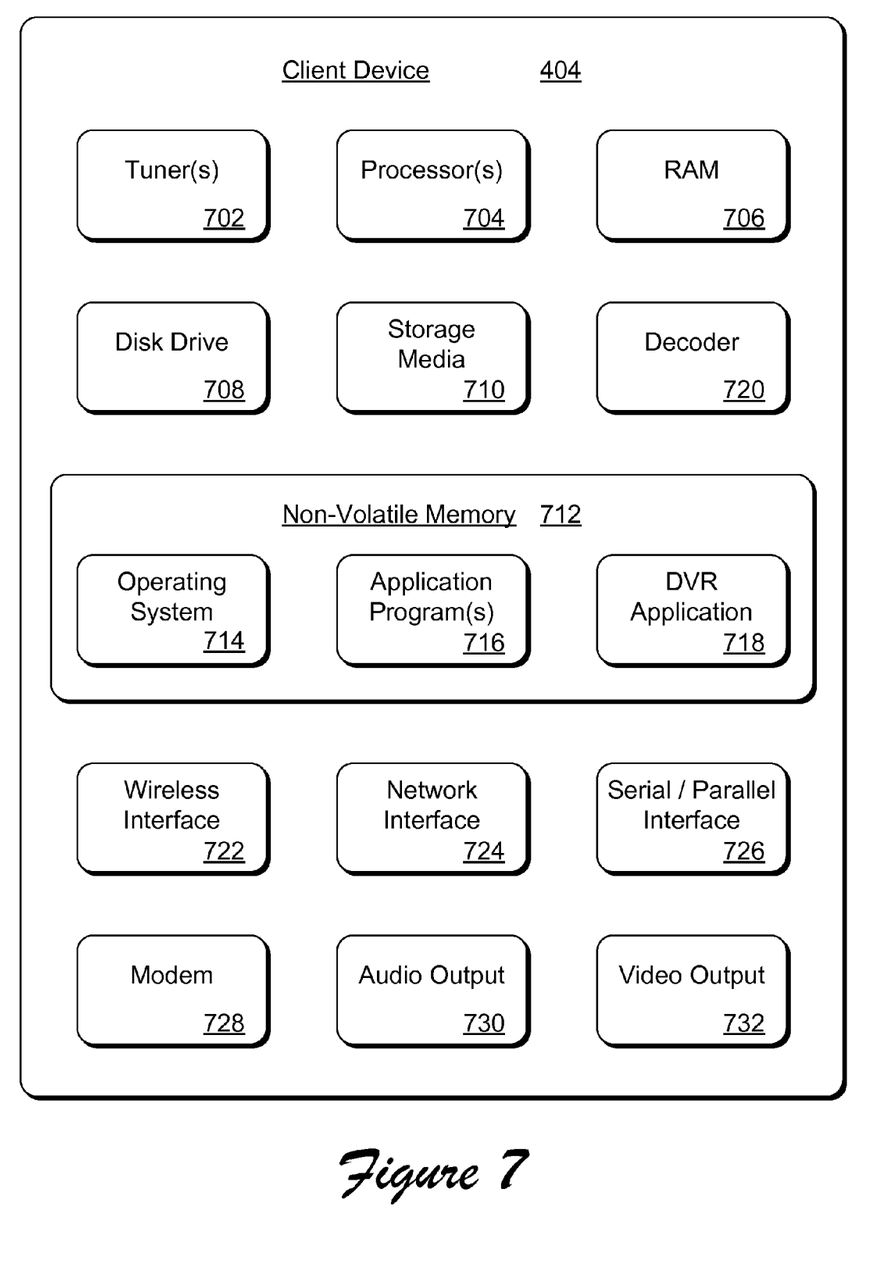
FIG. 7 is a block diagram that illustrates select components of an exemplary client device through which a synchronized media experience may be presented.

FIG. 7 illustrates selected components of client device 404 shown in FIGS. 4 and 6. Client device 404 includes one or more tuners 702. Tuners 702 are representative of one or more in-band tuners that tune to various frequencies or channels to receive television signals, as well as an out-of-band tuner that tunes to another channel over which other data (e.g., electronic program guide, synchronization commands, control commands, and so on) may be communicated to client device 404. Tuners 702 may be implemented as traditional broadcast tuners or as virtual tuners configured to receive data over virtual channels that may be implemented, for example as part of a digital network.

Client device 404 also includes one or more processors 704 and one or more memory components. Examples of possible memory components include a random access memory (RAM) 706, a disk drive 708, a mass storage component 710, and a non-volatile memory 712 (e.g., ROM, Flash, EPROM, EEPROM, etc.). Alternative implementations of client device 404 can include a range of processing and memory capabilities, and may include more or fewer types of memory components than those illustrated in FIG. 7.

Processor(s) 704 process various instructions to control the operation of client device 404 and to communicate with other electronic and computing devices. The memory components (e.g., RAM 706, disk drive 708, storage media 710, and non-volatile memory 712) store various information and/or data such as media content, electronic programming guide (EPG) data, synchronization group settings, configuration information for client device 404, and/or graphical user interface information. In an alternate implementation, media content may be stored at a server, and may be accessed by client device 404. In such an implementation, client device 404 may include very limited storage and may rely on a server system to store media content that is recorded.

An operating system 714 and one or more application programs 716 may be stored in non-volatile memory 712 and executed on processor 704 to provide a runtime environment. A runtime environment facilitates extensibility of client device 404 by allowing various interfaces to be defined that, in turn, allow application programs 716 to interact with client device 404. In the illustrated example, a digital video recording (DVR) application 718 is stored in memory 712 to enable a user to record and/or control real-time presentation of media content. Client device 404 can also include other components pertaining to a television entertainment system which are not illustrated in this example for simplicity purposes. For instance, client device 404 can include a user interface application and user interface lights, buttons, controls, etc. to facilitate viewer interaction with the device.

Client device 404 also includes a decoder 720 to decode a video signal, such as an NTSC, PAL, SECAM or other TV system video signal. Client device 404 further includes a wireless interface 722, a network interface 724, a serial and/or parallel interface 726, and a modem 728. Wireless interface 722 allows client device 404 to receive input commands and other information from a user-operated input device, such as from a remote control device or from another IR, Bluetooth, or similar RF input device.

Network interface 724 and serial and/or parallel interface 726 allows client device 404 to interact and communicate with other electronic and computing devices via various communication links. Although not shown, client device 404 may also include other types of data communication interfaces to communicate with other devices. Modem 728 facilitates communication between client device 404 and other electronic and computing devices via a conventional telephone line.

Client device 404 also includes an audio output 730 and a video output 732 that provide signals to a television or other device that processes and/or presents or otherwise renders the audio and video data. Although shown separately, some of the components of client device 404 may be implemented in an application specific integrated circuit (ASIC). Additionally, a system bus (not shown) typically connects the various components within client device 404. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is made herein to one or more client devices, such as client device 404. As used herein, "client device" means any electronic device having data communications, data storage capabilities, and/or functions to process signals, such as broadcast signals, received from any of a number of different sources.

Methods for enabling a synchronized media experience may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 8:
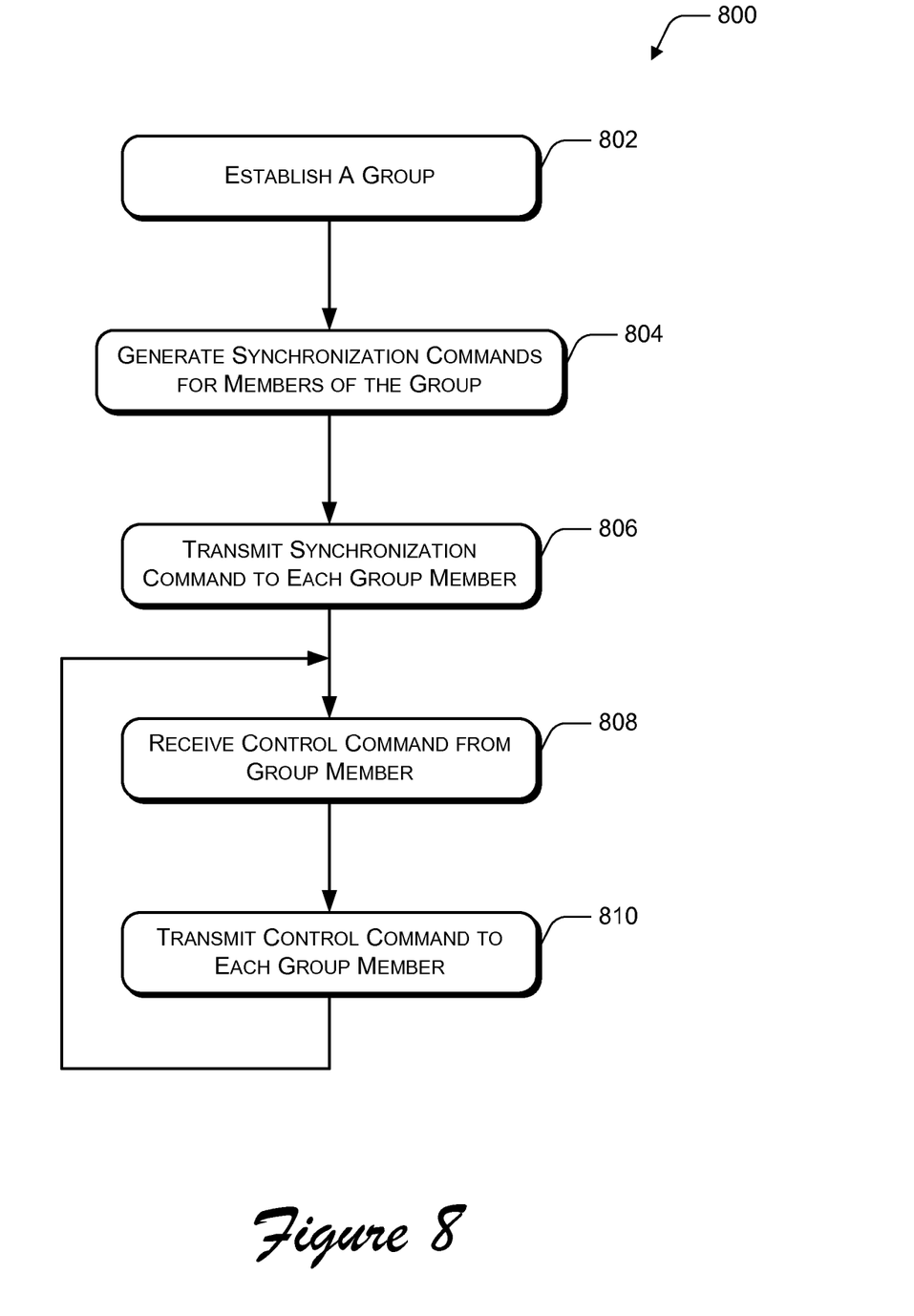
FIG. 8 is a flow diagram that illustrates an exemplary method for managing a synchronized media experience.
Figure 9:
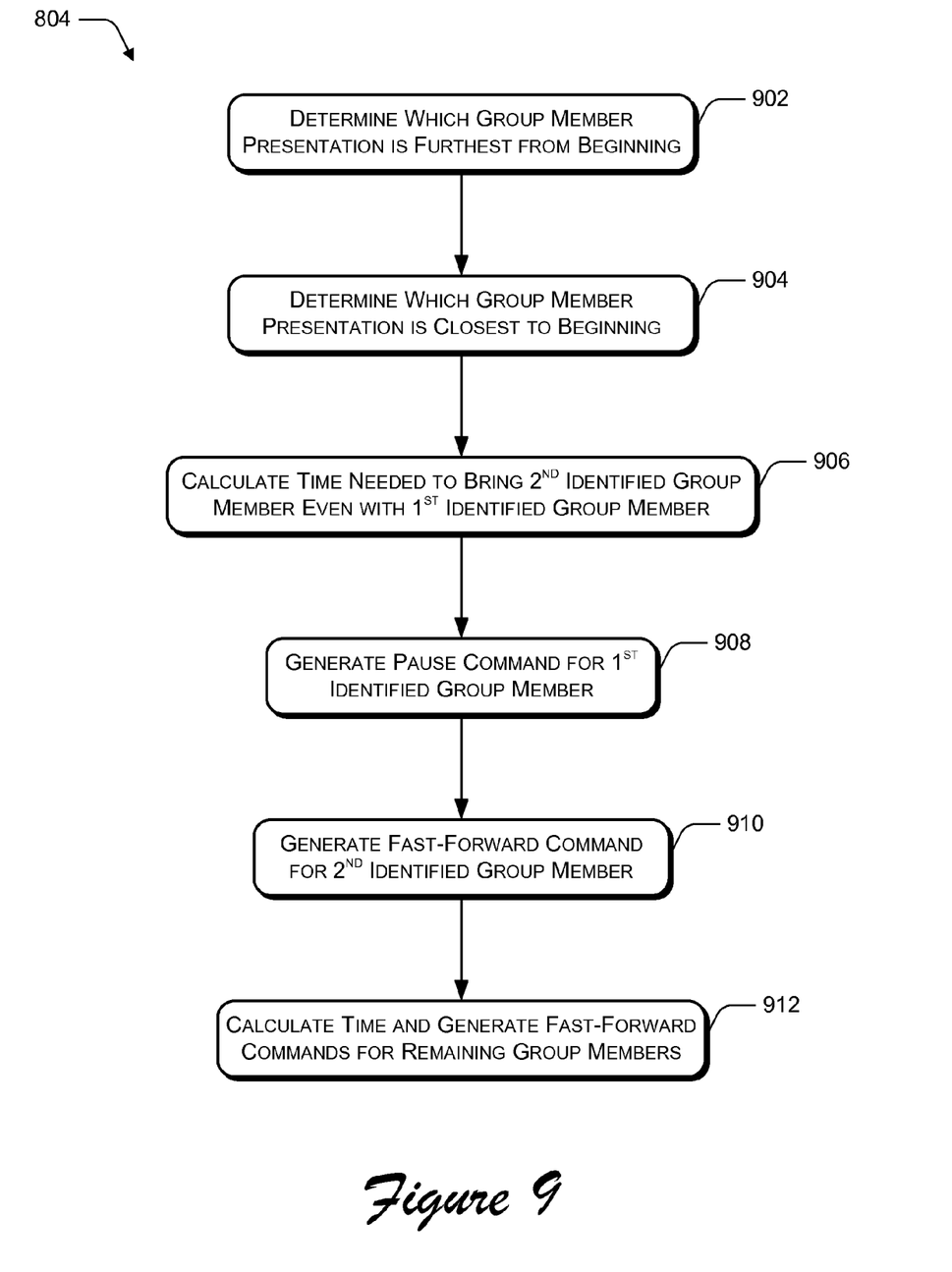
FIG. 9 is a flow diagram that illustrates an exemplary method for generating synchronization commands.

FIGS. 8 and 9 illustrate exemplary methods for implementing a synchronized media experience. FIGS. 8 and 9 are specific examples of an implementation of a synchronized media experience, and are not to be construed as limitations. Furthermore, it is recognized that various embodiments may implement any combination of the methods illustrated in FIGS. 8 and 9 or any combination of portions of the methods illustrated in FIGS. 8 and 9.

FIG. 8 illustrates an exemplary method 800 for managing a synchronized media experience. The order in which the method is described is not intended to be construed as a limitation, and any number of the described method blocks can be combined in any order to implement the method. Furthermore, the method can be implemented in any suitable hardware, software, firmware, or combination thereof.

At block 802, a server establishes a group. For example, referring to FIG. 4, media server 402 receives group membership requests 416 and 418, and in response the requests, establishes a group that includes client devices 404 and 406.

At block 804, the server generates initial synchronization commands. For example, referring to FIG. 5, synchronization command generator 518 evaluates data stored in group member data store 516 to determine an appropriate point on a media timeline at which to synchronize the group members. Synchronization command generator 518 then generates synchronization commands that, when applied by client devices that belong to the group, will result in the group member client devices being synchronized to the determined point on the media timeline. One exemplary method for generating the synchronization commands is illustrated and described below with reference to FIG. 9.

At block 806, the server transmits the synchronization commands to the appropriate client devices. For example, referring to FIG. 4, synchronization command 420 is transmitted to client device 404 and synchronization command 422 is transmitted to client device 406.

At block 808, the server receives a control command from a group member. For example, referring to FIG. 4, media server 402 receives control command 430 from user 408 via client device 404.

At block 810, the server transmits the control command to each member of the group. For example, referring to FIG. 4, as indicated by arrows 436 and 438, media server 402 transmits control command 430 to client device 404 and client device 406.

FIG. 9 illustrates an exemplary method 804 for generating synchronization commands. The order in which the method is described is not intended to be construed as a limitation, and any number of the described method blocks can be combined in any order to implement the method. Furthermore, the method can be implemented in any suitable hardware, software, firmware, or combination thereof.

At block 902, a server determines which group member presentation of a particular media content is furthest from the beginning of a timeline associated with the media content. That is, the server determines which group member is furthest along in presenting the media content.

At block 904, the server determines which group member presentation of the particular media content is closest to the beginning of the timeline associated with the media content. That is, the server determines which group member is furthest behind the others in presenting the media content.

At block 906, the server calculates the time needed to bring the second identified group member (i.e., the group member whose presentation is furthest behind) even with the first identified group member (i.e., the group member whose presentation is furthest along). For example, if the second identified group member's presentation is five minutes behind the first identified group member's presentation, and a fast forward command with a play rate of two times normal can be generated, then the time need for the second group member to catch up to the first group member is 2 min. 30 sec (assuming the first group member's presentation is paused for 2 minutes and 30 seconds).

At block 908, the server generates a pause command for the first identified group member. For example, synchronization command generator 518 generates a pause command that will direct the first identified group member to pause its presentation of the media content for the amount of time calculated as described above with reference to block 906.

At block 910, the server generates a fast-forward command for the second identified group member. For example, synchronization command generator 518 generates a fast-forward command that will direct the second identified group member to fast-forward its presentation of the media content at a specified rate for the period of time specified with the pause command generated for the first identified group member. After the first identified group member executes the pause command and the second identified group member executes the fast-forward command, both group member's presentations will be synchronized.

At block 912, the server generates fast-forward commands for any remaining group members. For example, other members of the group may be at various presentation positions between the furthest back and furthest ahead, which have been identified as described above with reference to blocks 902 and 904. In an exemplary implementation, fast-forward commands of varying rates, but all with the same duration are generated, such that, when executed, each of the group member's media presentations will be synchronized. In an alternate implementation, fast-forward commands of the same rate, coupled with pause commands of varying durations are generated, such that, when executed, the fast-forward command brings the given group member to the same presentation point as the first identified group member (see block 902), and the pause command is then executed for a duration that allows other group members to also fast-forward to the same presentation point.

Figure 10:
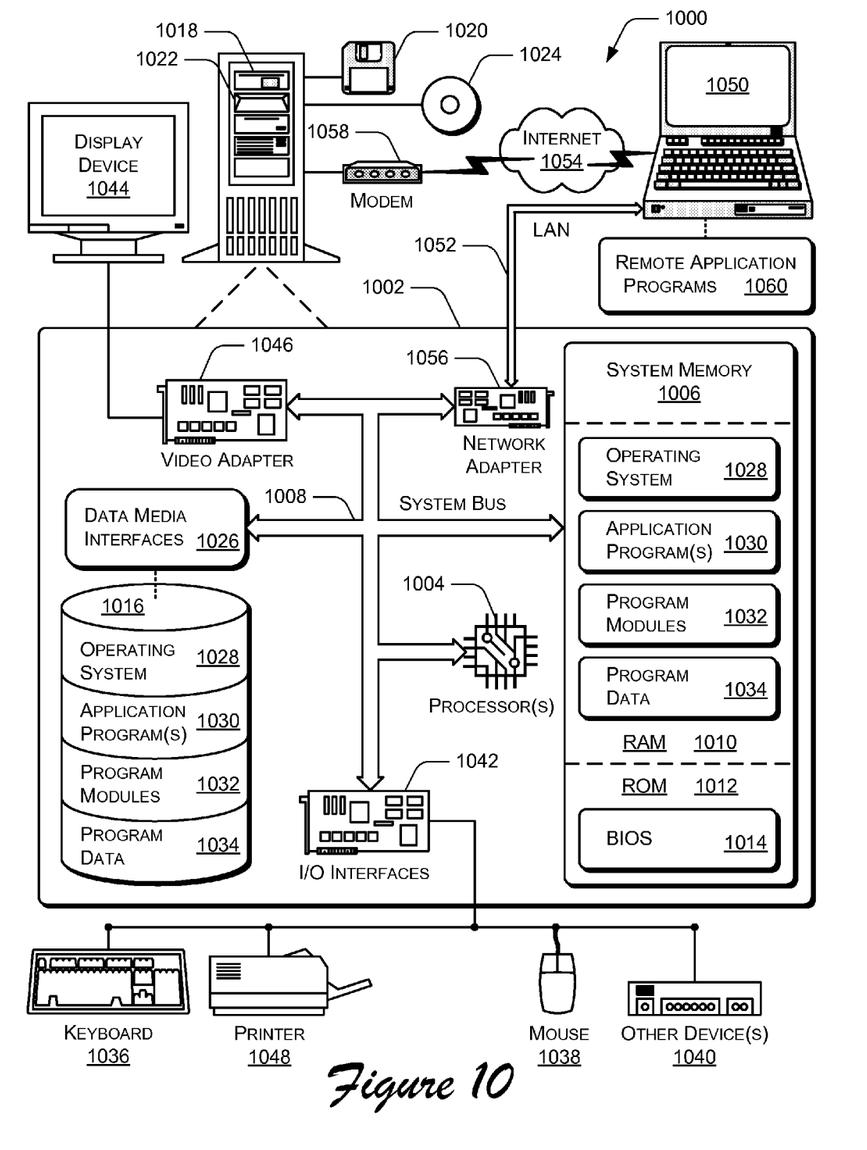
FIG. 10 is a pictorial/block diagram of exemplary computing systems, devices, and components in an environment in which a synchronized media experience may be implemented.

FIG. 10 illustrates an exemplary computing environment 1000 within which synchronized media experience systems and methods, as well as the computing, network, and system architectures described herein, can be either fully or partially implemented. Exemplary computing environment 1000 is only one example of a computing system and is not intended to suggest any limitation as to the scope of use or functionality of the architectures. Neither should the computing environment 1000 be interpreted as having any dependency or requirement relating to any one or combination of components illustrated in the exemplary computing environment 1000.

The computer and network architectures in computing environment 1000 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1000 includes a general-purpose computing system in the form of a computing device 1002. The components of computing device 1002 can include, but are not limited to, one or more processors 1004 (e.g., any of microprocessors, controllers, and the like), a system memory 1006, and a system bus 1008 that couples the various system components. The one or more processors 1004 process various computer executable instructions to control the operation of computing device 1002 and to communicate with other electronic and computing devices. The system bus 1008 represents any number of several types of bus structures, including a memory bus or memory controller, a peripheral bus, an accelerated graphics port, and a processor or local bus using any of a variety of bus architectures.

Computing environment 1000 includes a variety of computer readable media which can be any media that is accessible by computing device 1002 and includes both volatile and non-volatile media, removable and non-removable media. The system memory 1006 includes computer readable media in the form of volatile memory, such as random access memory (RAM) 1010, and/or non-volatile memory, such as read only memory (ROM) 1012. A basic input/output system (BIOS) 1014 maintains the basic routines that facilitate information transfer between components within computing device 1002, such as during start-up, and is stored in ROM 1012. RAM 1010 typically contains data and/or program modules that are immediately accessible to and/or presently operated on by one or more of the processors 1004.

Computing device 1002 may include other removable/non-removable, volatile/non-volatile computer storage media. By way of example, a hard disk drive 1016 reads from and writes to a non-removable, non-volatile magnetic media (not shown), a magnetic disk drive 1018 reads from and writes to a removable, non-volatile magnetic disk 1020 (e.g., a "floppy disk"), and an optical disk drive 1022 reads from and/or writes to a removable, non-volatile optical disk 1024 such as a CD-ROM, digital versatile disk (DVD), or any other type of optical media. In this example, the hard disk drive 1016, magnetic disk drive 1018, and optical disk drive 1022 are each connected to the system bus 1008 by one or more data media interfaces 1026. The disk drives and associated computer readable media provide non-volatile storage of computer readable instructions, data structures, program modules, and other data for computing device 1002.

Any number of program modules can be stored on RAM 1010, ROM 1012, hard disk 1016, magnetic disk 1020, and/or optical disk 1024, including by way of example, an operating system 1028, one or more application programs 1030, other program modules 1032, and program data 1034. Each of such operating system 1028, application program(s) 1030, other program modules 1032, program data 1034, or any combination thereof, may include one or more embodiments of the synchronized media experience systems and methods described herein.

Computing device 1002 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 1002 via any number of different input devices such as a keyboard 1036 and pointing device 1038 (e.g., a "mouse"). Other input devices 1040 (not shown specifically) may include a microphone, joystick, game pad, controller, satellite dish, serial port, scanner, and/or the like. These and other input devices are connected to the processors 904 via input/output interfaces 1042 that are coupled to the system bus 1008, but may be connected by other interface and bus structures, such as a parallel port, game port, and/or a universal serial bus (USB).

A display device 1044 (or other type of monitor) can be connected to the system bus 1008 via an interface, such as a video adapter 1046. In addition to the display device 1044, other output peripheral devices can include components such as speakers (not shown) and a printer 1048 which can be connected to computing device 1002 via the input/output interfaces 1042.

Computing device 1002 can operate in a networked environment using logical connections to one or more remote computers, such as remote computing device 1050. By way of example, remote computing device 1050 can be a personal computer, portable computer, a server, a router, a network computer, a peer device or other common network node, and the like. The remote computing device 1050 is illustrated as a portable computer that can include any number and combination of the different components, elements, and features described herein relative to computing device 1002.

Logical connections between computing device 1002 and the remote computing device 1050 are depicted as a local area network (LAN) 1052 and a general wide area network (WAN) 1054. Such networking environments are commonplace in offices, enterprise-wide computer networks, intranets, and the Internet. When implemented in a LAN networking environment, the computing device 1002 is connected to a local network 1052 via a network interface or adapter 1056. When implemented in a WAN networking environment, the computing device 1002 typically includes a modem 1058 or other means for establishing communications over the wide area network 1054. The modem 1058 can be internal or external to computing device 1002, and can be connected to the system bus 1008 via the input/output interfaces 1042 or other appropriate mechanisms. The illustrated network connections are merely exemplary and other means of establishing communication link(s) between the computing devices 1002 and 1050 can be utilized.

In a networked environment, such as that illustrated with computing environment 1000, program modules depicted relative to the computing device 1002, or portions thereof, may be stored in a remote memory storage device. By way of example, remote application programs 1060 are maintained with a memory device of remote computing device 1050. For purposes of illustration, application programs and other executable program components, such as operating system 1028, are illustrated herein as discrete blocks, although it is recognized that such programs and components reside at various times in different storage components of the computing device 1002, and are executed by the one or more processors 904 of the computing device 1002.

Although embodiments of a synchronized media experience have been described in language specific to structural features and/or methods, it is to be understood that the subject of the appended claims is not necessarily limited to the specific features or methods described. Rather, the specific features and methods are disclosed as exemplary implementations of a synchronized media experience.

The invention claimed is:

1. A method comprising:
    identifying a group of media entertainment client devices;
    generating a group identity having no associated members;
    receiving a group membership request to associate with the group identity, the group membership request including:
        data indicating a timeline position; and
        a media content identifier associated with media content presented by the media entertainment client devices;
    determining a first media entertainment client device of the group which is furthest, in presenting of the media content, from a beginning of a timeline associated with the media content;
    determining a second media entertainment client device of the group which is closest, in presenting of the media content, from the beginning of the timeline associated with the media content;
    calculating a time to synchronize the first and second media entertainment client devices on the timeline;
    generating a first synchronization command, the first synchronization command including a pause command which directs the first media entertainment client device to pause presenting the media content;
    generating a second synchronization command, the second synchronization command including a fast-forward command which directs the second media entertainment client device to fast-forward presenting the media content at a first rate; and
    communicating the first and second synchronization commands to the first and second media entertainment client devices, respectively, such that execution of the synchronization commands by the media entertainment client devices results in synchronized presentation of media content by each of the media entertainment client devices.

2. The method as recited in claim 1, wherein pausing the first media entertainment client device pauses presentation of the media content for a specified period of time.

3. The method as recited in claim 1, further comprising communicating a third synchronization command to the first and second media entertainment client devices, the third synchronization command including a play command that directs the first and second media entertainment client devices to play the media content at a play rate for a specified period of time.

4. The method as recited in claim 3, wherein the play rate comprises at least one of a normal forward play rate, a fast forward play rate, a normal reverse play rate, or a fast reverse play rate.

5. The method as recited in claim 1, wherein the second synchronization command further comprises a jump command that includes a timeline position indicator, the jump command directing the at least one of the media entertainment client devices to begin presenting the media content at a position in a timeline associated with the media content indicated by the timeline position indicator.

6. The method as recited in claim 1, wherein identifying the group of two or more media entertainment client devices comprises:
    generating a group identity having no associated members; and
    receiving requests indicating at least first and second media entertainment client devices to associate with the group identity.

7. The method as recited in claim 1, wherein receiving the request comprises receiving the request from one of the two or more media entertainment client devices via a media network over which media content may be transmitted.

8. The method as recited in claim 7, wherein receiving the request comprises receiving the request as an audible signal via a voice-over-IP network.

9. The method as recited in claim 1, further comprising:
    receiving a control command; and
    communicating the control command to each of the two or more media entertainment client devices, thereby enabling synchronized control of the media content being presented by each of the two or more media entertainment client devices.

10. The method as recited in claim 9, wherein the control command comprises at least one of a pause command, a fast-forward command, a play command, a rewind command, or a channel change command.

11. A system comprising:
    first and second media entertainment client devices, each configured to present a media content at a user-controlled presentation rate;
    a server configured to;
        receive group membership requests from at least one of the first and second media entertainment client devices to either form or join a synchronization group in which members of the synchronization group may receive synchronized presentation of the media content;
        determine, based at least in part on the group membership requests, a position along a timeline associated with the media content for each of the first and second media entertainment client devices; and
        calculate a time to synchronize the first and second media entertainment devices on the timeline when the position for the first entertainment client device and the position for the second entertainment client device are different; and
    a media synchronization engine configured to communicate, based at least in part on the time to synchronize, a synchronization command to the first media entertainment client device resulting in synchronized presentation of the media content by the first and second media entertainment client devices.

12. The system as recited in claim 11, further comprising an IP network over which the media synchronization engine communicates the synchronization command to the first media entertainment client device.

13. The system as recited in claim 11, wherein the media synchronization engine is further configured to:
    receive a control command from a user associated with the first media entertainment client device; and
    communicate the control command to the second media entertainment client device, thereby maintaining synchronized presentation of the media content by the first and second media entertainment client devices.

14. The system as recited in claim 13, further comprising a communication network over which the control command may be received.

15. The system as recited in claim 14, wherein the communication network comprises at least one of an IP network, a voice-over-IP network, a streaming media network, or a cable television network.

16. A computer storage device comprising computer-readable instructions that, when executed, cause a computer system to:
    identify a group of media entertainment client devices;

determine a first media entertainment client device of the group which is furthest, in presenting of the media content, from a beginning of a timeline associated with the media content;

determine a second media entertainment client device of the group which is closest, in presenting of the media content, from the beginning of the timeline associated with the media content;

calculate a time to synchronize the first and second media entertainment client devices on the timeline;

generate a first synchronization command, the first synchronization command including a pause command which directs the first media entertainment client device to pause presenting the media content;

generate a second synchronization command, the second synchronization command including a jump command that includes a timeline position indicator, the jump command directing the second media entertainment client device to begin presenting the media content at a position in a timeline associated with the media content indicated by the timeline position indicator; and communicate the first and second synchronization commands to the first and second media entertainment client devices, respectively, such that execution of the synchronization commands by the media entertainment client devices results in synchronized presentation of media content by each of the media entertainment client devices.

17. The computer storage device as recited in claim 16, further comprising computer-readable instructions that, when executed, cause the computer system to:

receive a control command from a user associated with a particular one of the media entertainment client devices; and distribute the control command to each media entertainment client device in the group of media entertainment client devices, thereby maintaining synchronized presentation of the media content by each of the media entertainment client devices.

18. The computer storage device as recited in claim 16, wherein pausing the first media entertainment client device pauses presentation of the media content for a specified period of time.

19. The computer storage device as recited in claim 16, further comprising computer-readable instructions that, when executed, cause the computer system to:

communicate a third synchronization command to the first and second media entertainment client devices, the third synchronization command includes a play command that directs the first and second media entertainment client devices to play the media content at a play rate for a specified period of time.

20. The computer storage device as recited in claim 19, wherein the play rate comprises at least one of a normal forward play rate, a fast forward play rate, a normal reverse play rate, or a fast reverse play rate.

* * * * *